United States Patent [19]

Menin et al.

[11] 4,225,951
[45] Sep. 30, 1980

[54] FISH COUNTER WITH SCANNING TRANSDUCER

[75] Inventors: Albert S. Menin, Sylmar; Merrill E. Fife, Canyon Country, both of Calif.

[73] Assignee: The Bendix Corporation, North Hollywood, Calif.

[21] Appl. No.: 9,632

[22] Filed: Feb. 5, 1979

[51] Int. Cl.$^2$ .............................................. G01S 9/60
[52] U.S. Cl. ..................................... 367/105; 367/93; 367/108
[58] Field of Search ...................... 367/87, 93, 105, 108

[56] References Cited

U.S. PATENT DOCUMENTS 4,034,331  7/1977  Menin et al. ...................... 367/108 X Primary Examiner—Richard A. Farley
Attorney, Agent, or Firm—Robert C. Smith; William F. Thornton

[57] ABSTRACT

A system for counting fish in a body of water uses one or more acoustic focusing liquid lens transducers each of which includes a large number of individual piezoelectric elements arranged in an arc to create a fan-shaped pattern of adjacent beams, each of which has a narrow beam width. An electrical counting circuit includes a clock producing a series of timing pulses supplied to a plurality of binary coded decimal (BCD) actuated switch circuits, one of which initiates sequential operation of transmit pulses from individual transducer elements. Timing of receiver operation is also controlled by said timing pulses after a delay to minimize "ringing" of the transducer elements from the transmit pulses. Received echo signals are amplified, threshold detected and converted to uniform pulses. A second BCD actuated switch circuit cooperates with a series of range gates also connected to receive said timing pulses to control the distribution of the uniform echo pulses to one of a series of counters each of which receives and counts pulses from a single transducer element. Display means connected to the counters make it possible to read out counts on individual sectors individually or collectively or to print out counts from the counters at specified time intervals. Where a plurality of liquid lens transducers are used, they are connected to the same clock pulses such that they operate in synchronism.

11 Claims, 7 Drawing Figures

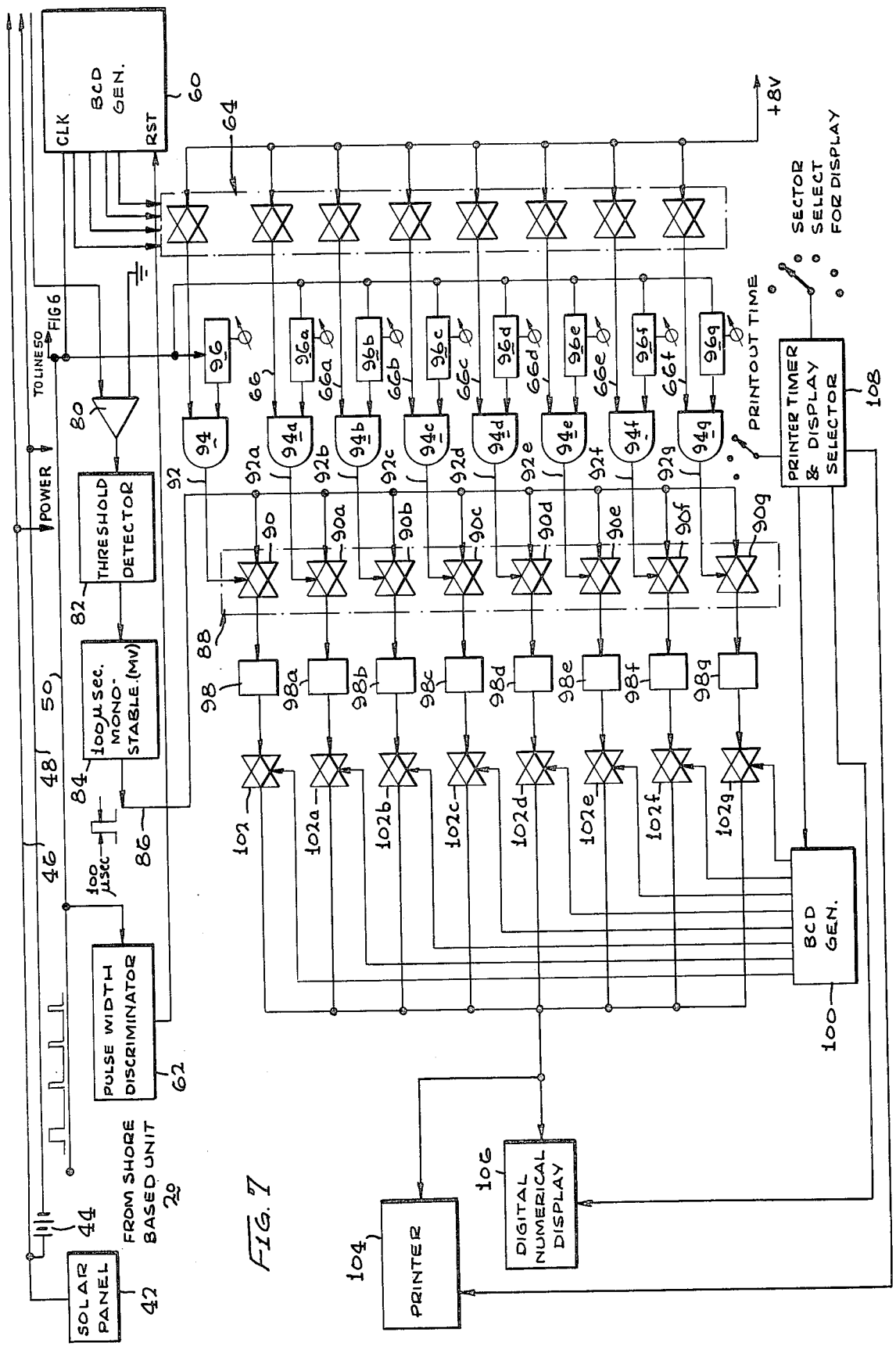

FISH COUNTER WITH SCANNING TRANSDUCER

BACKGROUND OF THE INVENTION

The task of counting migrating fish is one that has been dealt with over the past many years either by direct visual counting or through the use of various counting devices. In U.S. Pat. No. 4,034,331 patented by Albert S. Menin and Robert M. Bridges (common assignee), a sonar fish counter is disclosed which includes a straight, relatively stiff pipe or ladder-like structure forming an artificial bottom and from which is suspended a webbing or similar type of obstacle which makes contact with the actual river bottom to force the fish to swim over the artificial bottom structure. A side scanning sonar transducer is then used to insonify the volume of water immediately over the artificial bottom, receiving echoes from the fish swimming over this structure. This type of system is quite satisfactory for counting salmon migrating in streams, as they do in Alaska and many other streams flowing into the Pacific Ocean, since they tend to swim in relatively well-defined channels close to the stream bottom. This type of counter cannot accurately count fish of other varieties or salmon which do not tend to swim in closely defined channels since the beam width is such that the sonar would inherently miss counting a high percentage of the fish. It has become apparent that a substantially different type of counter is required for counting fish in large rivers and estuaries where large areas must be covered by the sonar.

DESCRIPTION OF THE DRAWINGS

FIG. 7 is an additional portion of the electrical system shown in part in FIG. 5.

DESCRIPTION OF THE PREFERRED EMBODIMENT

Figure 1:
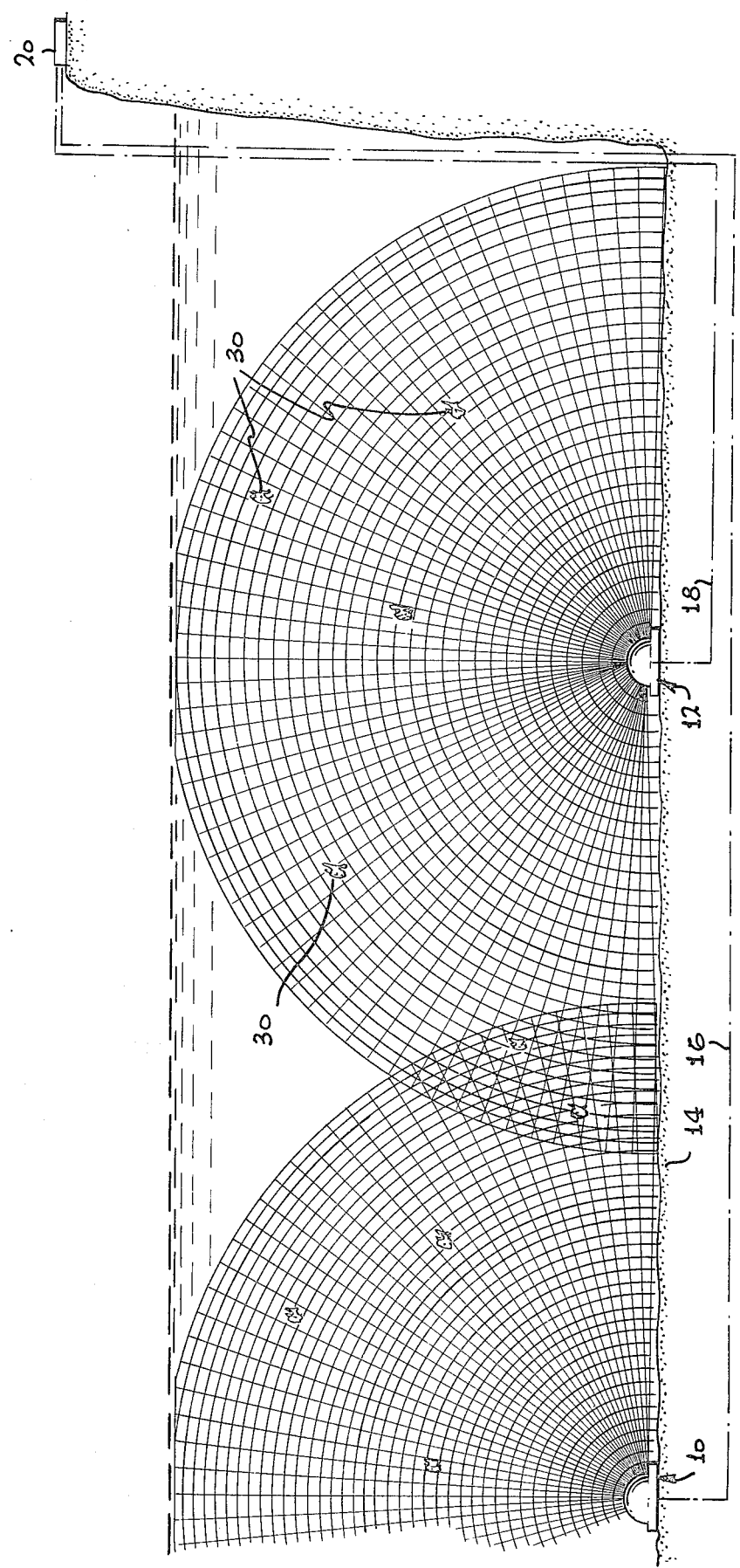
FIG. 1 is a view of a pair of transducers located in a large stream bed showing the sonar beam pattern as it would exist perpendicular to the direction of flow of the stream.
Figure 2:
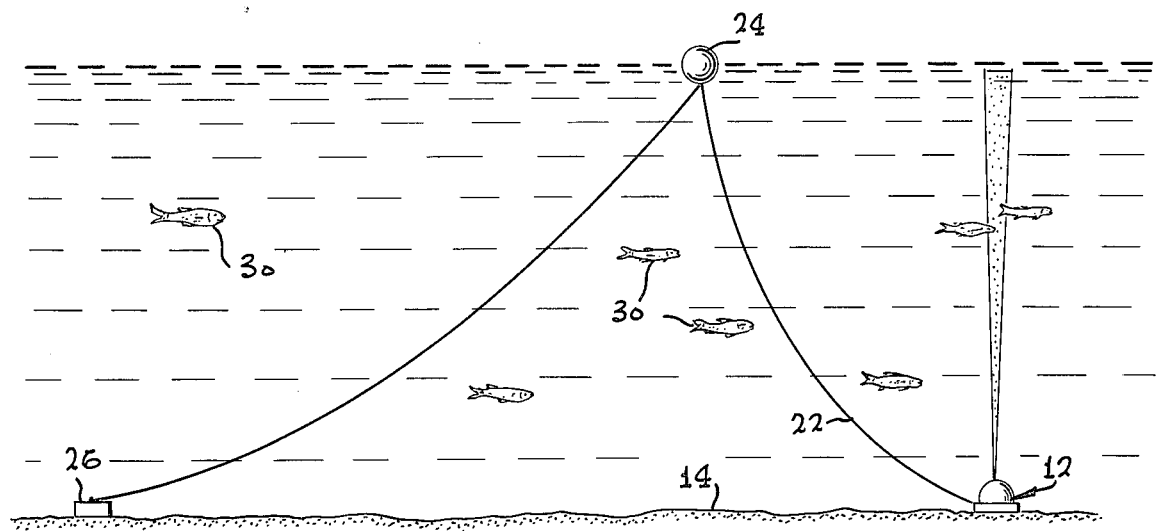
FIG. 2 is a view of the stream bed and the sonar beam pattern perpendicular to that shown in FIG. 1.

Referring now to FIG. 1, a pair of transducers 10 and 12 are shown installed on the bottom 14 of a stream bed. The transducers are connected by means of cables 16 and 18 to a shore-based electronics unit 20 from which the transducers receive power and to which they supply return signals. The beam patterns are shown as they would exist if visible to one looking upstream. It wll be observed that the patterns, being roughly semicircular, overlap somewhat near the bottom but leave an uncovered area near the surface. This area can be reduced or increased by the placement of the transducers. Means are also included for terminating the beam just short of the surface, which is discussed below. FIG. 2 shows one of the transducers as viewed from the side or across the stream and perpendicularly with respect to FIG. 1. Here it will be seen that the transducer beam pattern is very narrow and upwardly directed. Also attached to the transducer 12 is a cable 22 supported by a marker buoy 24 which is, in turn, fastened to an upstream anchor 26 by means of another cable 28. The beam pattern covers a sufficiently large area that most of the fish 30 are illuminated thereby and caused to be counted.

Figure 3:
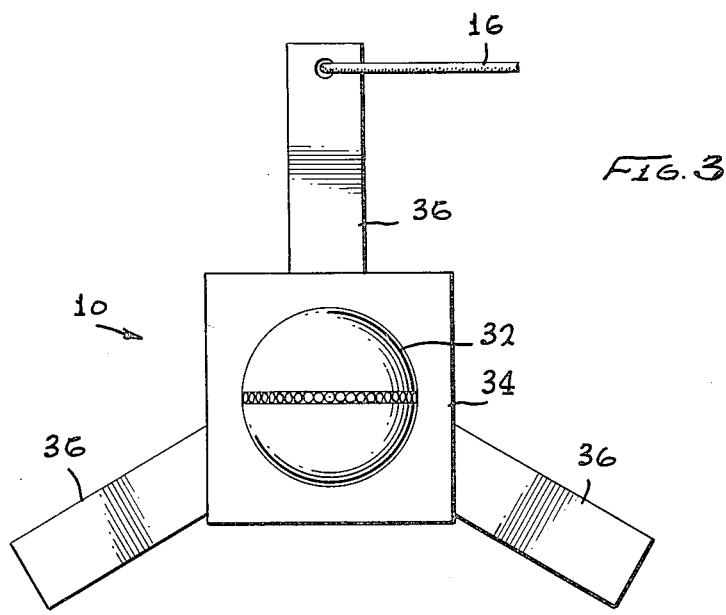
FIG. 3 is a top, or plan, view of a sonar transducer of the type usable with my invention.
Figure 4:
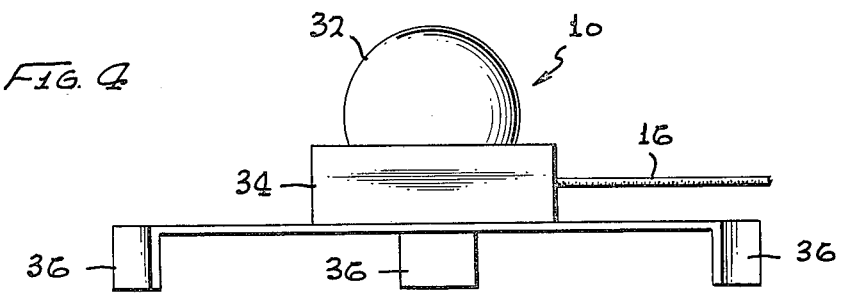
FIG. 4 is a side view of the transducer of FIG. 3.

FIG. 3 is a top or plan view of the transducer 10 (transducer 12 is identical). The acoustic focusing liquid lens transducer includes a spherical housing 32 of an acoustically transparent material such as ABS plastic supported on a housing 34 which contains some of the electronic circuitry discussed below. The housings 32 and 34 are supported on a simple stand consisting of three legs 36 which are preferably positioned 120° apart to provide a stable platform against current movement, minor collisions with fish or debris, etc. As shown in FIGS. 1 and 2, a cable 16 connects housing 34 with the shore-based electronics unit 20.

Figure 5:
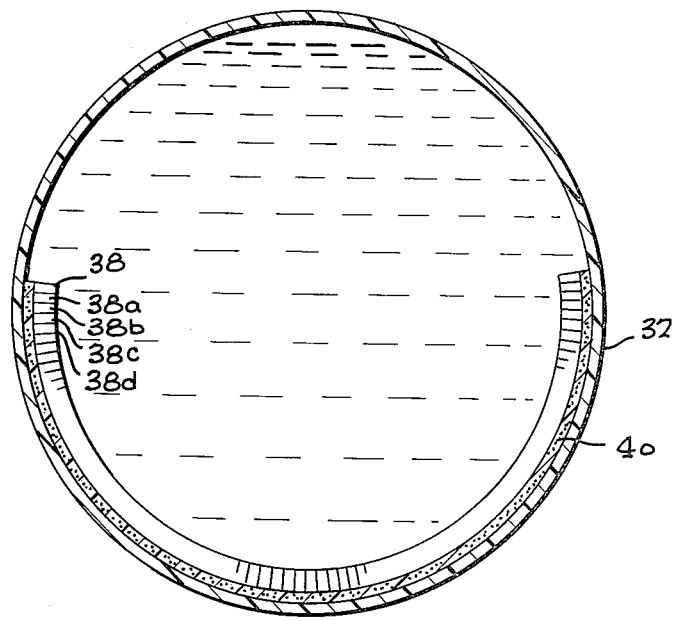
FIG. 5 is a sectional view showing details of the transducers described in FIGS. 3 and 4.

Since the acoustic focusing liquid lens transducer 32 is of a relatively recent type which may not be well understood by all who may be interested in the present invention, it will be described in some detail. With reference to FIG. 5, the transducer is composed of an acoustic lens which focuses transmitted and received acoustic energy onto many small active electroacoustic transducer elements 38. The acoustic lens makes it possible to form many separate narrow acoustic beams in a compact size, which enable large areas to be scanned without any mechanical motion of the acoustic device. The beam width and beam orientation are determined by the shape, size and location of the electroacoustic elements and the focusing characteristics of the acoustic lens. The focusing characteristics of the lens are determined by size, shape and index of refraction value of the materials which are located between the electroacoustic elements and the water medium.

One such device designed to scan a fan-shaped region consists of a spherically shaped lens with an array of electroacoustic piezoelectric transducer elements 38, 38a, 38b, 38c, etc., mounted to the inside surface of the spherical housing 32 which may be of ABS plastic and oriented circumferentially along the bottom of the housing. Each piezoelectric element in conjunction with the lens forms its own acoustic beam which looks out directly across the sphere. All of the beams together (typically sixty-four) from the fan-shaped pattern of FIG. 1. The number and location of the active elements can be modified as desired to effectively insonify the region where fish may be located. To produce the patterns of FIG. 1, the elements should preferably be arranged in an arc somewhat larger than 180°, as shown in FIG. 5. The inside of the lens is filled with low sound velocity fluid which in conjunction with the acoustic window material and its thickness serves to focus the acoustic energy leaving and returning to the transducer onto the piezoelectric elements.

The back sides of the piezoelectric elements are acoustically decoupled from the shell by use of a compliant material 40 such as Corprene between the acoustic elements and the shell material.

Figure 6:
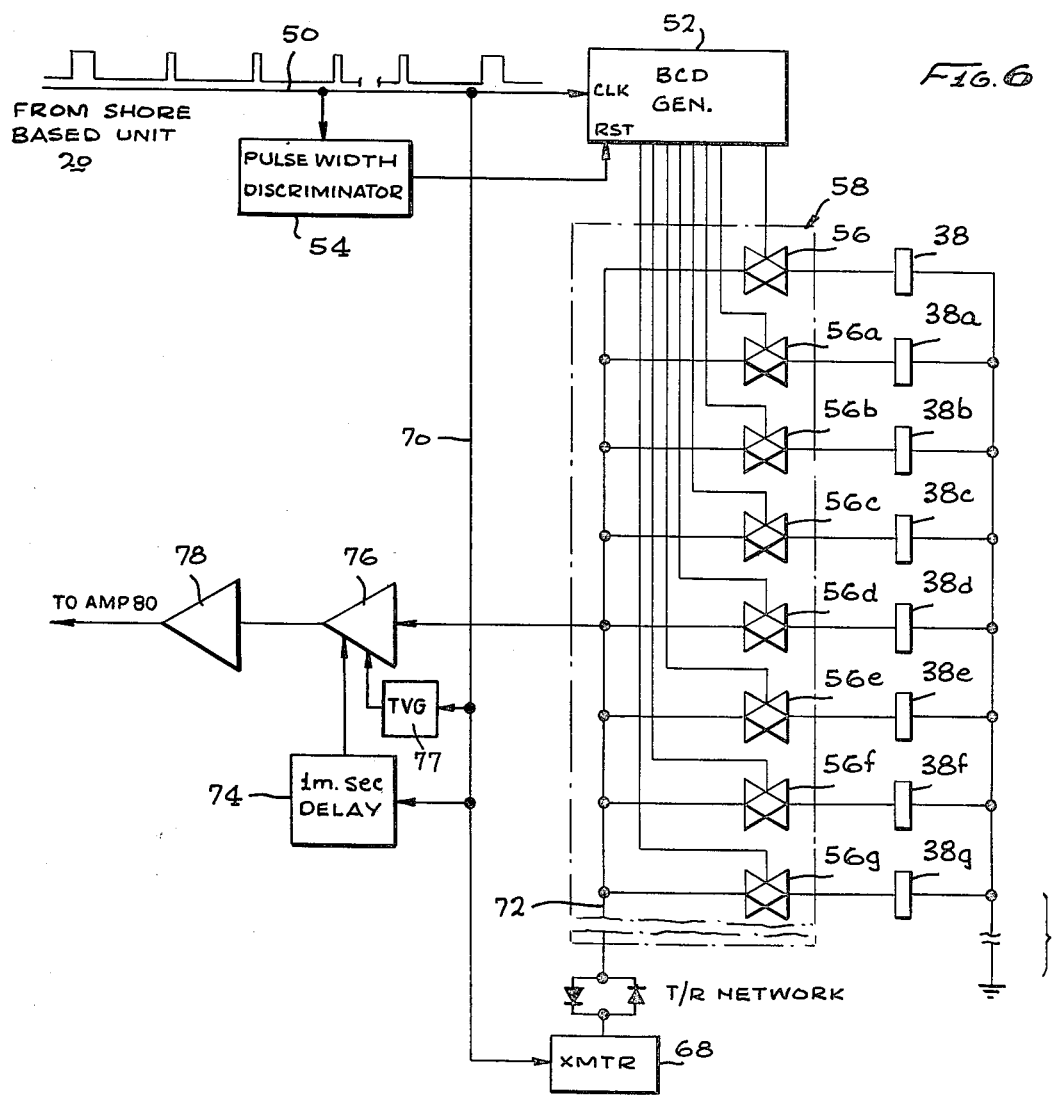
FIG. 6 is a schematic drawing showing a portion of the electrical system associated with said transducers.

The electronics system incorporates a shore-based electronics unit 20 which includes a solar panel 42 which responds to sunlight to continually charge a battery 44 which is connected to the electronics system through a positive direct current line 46 and a ground line 48. While these power lines are not shown interconnected into the system described below, it will be recognized that battery power (preferably regulated) is to be supplied to the various circuits discussed below as required. Also forming part of the shore-based unit 20 is a clock which provides a pulse output consisting of a series of timing pulses interspersed at intervals with a wide synchronizing pulse for synchronizing a plurality of sequencers which are actually in the form of BCD (binary coded decimal) generators. Each of these generators is connected to a switching unit including a large number of electronic switches, each switch of one such unit being connected to one of the many (64) piezoelectric transducer elements 38, 38a, 38b, 38c, etc., and coded to respond to a desired digital signal to connect its particular transducer element to the remainder of the system and other switching units are synchronized to switch corresponding channels in unison, as will appear below. Referring now to FIG. 6, a pulse train is shown in a wire 50 supplied from the shore-based electronics unit 20 to a BCD generator 52 and a pulse width discriminator 54. Discriminator 54 senses the periodic extra wide timing pulses on the pulse train and responds by supplying a reset pulse to reset the BCD generator 52 and other BCD generators to zero. The next pulse will then be supplied to cause the BCD generator to generate a binary number one to close the first 56 of the many (64) switches in the digital switching unit 58, thus connecting a first transducer element 38 to the system. Generator 52 will then respond to a binary number two to open the first switch 56 and close the second such switch 56a to disconnect the first transducer element 38 and connect the second transducer element 38a to the system. The BCD generator 52 will continue to supply coded pulses to the digital switching unit 58 to successively close switches 56b, 56c, 56d, etc., thereby successively connecting the corresponding transducer elements 36b, 36c, 36d, etc. to the system and disconnecting the previously connected transducer element.

FIG. 7 shows an additional part of the electronic circuit including a second BCD generator 60 which is also connected to wire 50 from which it receives the timing pulses from shore-based electronics unit 20. Also connected to wire 50 is a pulse width discriminator 62 which responds to receipt of the wide pulse to provide a reset signal to the reset terminal of BCD generator 60, as described above. Generator 60 operates with an internal binary code to provide binary pulse-coded numbers to the electronic switching unit 64 which is connected to a +8-volt power source. Generator 60 thus operates to successively connect a series of output lines 66, 66a, 66b, 66c, 66d, etc., corresponding to each of the transducers with this voltage source. It will be understood that the individual switches in unit 64 are each closed by means of a signal from BCD generator 60 in the same manner as described above with respect to BCD generator 52 and switching unit 58.

In FIG. 6 a transmitter 68 is shown connected to receive through a wire 70 the timing and reset pulse train on wire 50. This transmitter responds to the occurrence of each timing pulse to provide on a wire 72 a transmit burst of 30 pulses of approximately 300 KHz having a duration of 100 microseconds. Because of the action of BCD generator 52 and switching unit 58, only one of the transducers 38, 38a, 38b, etc. will be energized with each transmit burst, but all will be energized in sequence to transmit the successive narrow beam patterns which result in the fan-shaped sweep pattern shown in FIG. 1. Following each timing pulse, a timing circuit 74 imposes a delay of approximately one millisecond to permit any transducer "ringing" to decay to an acceptable level, after which a preamplifier 76 is enabled. This preamplifier is connected to receive any sonar return signals which appear on the transducers but will, of course, receive only returns from the transducer which was just previously energized since only its corresponding switching circuit 56, 56a, 56b, etc. will be closed. Also connected to preamplifier 76 is a time-variable gain (TVG) circuit 77 which varies the gain of preamplifier 76 with increased time to compensate for increased range of return echoes. Signals amplified by preamplifier 76 are then supplied to a buffer 78 and then to an amplifier 80 (FIG. 7) where their level is increased before being supplied to a threshold detector 82 whose reference level is set such that only a signal having a level equal to or greater than the corresponding target strength of the species of fish desired to be counted will pass the detector 82 and actuate a 100-microsecond monostable multivibrator 84. Each output pulse from the multivibrator 84, which represents a count of one fish, will be a 100-microsecond pulse of 8-volt magnitude; therefore, at this point all counts passing the threshold detector 82 become the same in terms of duration and signal strength, and all of these appear on a wire 86 which is connected to all of the electronic switches in a switching unit 88. Each of the individual electronic switches 90, 90a, 90b, 90c, etc. is connected through a wire 92, 92a, 92b, 92c, 92d, etc. to a corresponding AND circuit 94, 94a, 94b, 94c, 94d, etc. to which the lines 66, 66a, 66b, 66c, 66d, etc. are also connected. The second input signal to the several AND gates is supplied from a plurality of range gates 96, 96a, 96b, 96c, 96d, etc. which are all connected to receive and be gated "on" by the timing pulses appearing on wire 50. Each range gate includes an individual variable timing adjustment which determines the length of time the gate remains "on", and therefore the length of time its corresponding AND circuit will conduct a signal to switch on the corresponding electronic switch 90, 90a, 90b, 90c, etc. Since the monostable multivibrator 84 conducts all echo pulses of such magnitude as to indicate a return from a fish and these all appear on line 86, the AND gates, which through the action of the clock pulses have their output synchronized with the transmit pulses, operate to switch the electronic switches 90, 90a, 90b, 90c, 90d, etc. in sequence such that each return pulse is connected through the proper electronic switch to its corresponding pulse counter which is one of a group of counters 98, 98a, 98b, 98c, etc., each corresponding to one transducer producing one narrow beam pattern. Again, the numbers of wires, AND gates, range gates, electronic switches and counters, etc. will correspond to the number of transducer elements (64) per transducer. In this manner it is possible to determine which beams are receiving the most counts, and this gives an indication of just where in the stream the fish may tend to concentrate. It may also aid in helping to determine how to locate a plurality of transducers so as to minimize lost counts from areas not covered by the sonar. On FIG. 1 it will be observed that there is such an area between the two fan-shaped patterns shown and also that the patterns cut off just below the surface. This is done by setting the individual range gates for beams directed such that they would normally reach the surface to shorter periods so that reflections from the surface will arrive after the range gates have turned off the corresponding AND gates.

The above describes what may be viewed as the essentials of the fish counter per se since it is obvious that one could simply take readings from the individual counters 98, 98a, 98b, 98c, etc. and add them up for a total count. It is preferable, however, to provide a convenient and flexible display means for displaying and printing the information contained in the counters. To effect this display, an additional sequencer is provided including BCD generator 100 which is connected to a series of electronic switches 102a, 102b, 102c, 102d, etc., each of which is connected to an output line from one of the counters 98, 98a, 98b, 98c, 98d, etc. The BCD generator 100 is not synchronized with the other such generators, but is set by the operator to route the counts on the counters to a printer 104 and a digital numerical display device 106. Either or both of printer 104 and digital numerical display device 106 may be operated as selected by the operator on a printer timer and display selector 108. When the operator decides to display the accumulated counts in counters 98, 98a, 98b, 98c, etc., he adjusts the controls on the display selector to select whether he wants a numerical display on device 106 or a printout on printer 104. He may also select a time interval between printouts such as to ask the timer and printer to print out the counts every hour, for example. Since sequencer 100 may be connected to a plurality of transducers, such as transducers 10 and 12, the printer, timer and display selector can also be instructed to cause the printer 104 to successively identify and print out the counter tallies of each of said transducers, successively.

In operation, the shore-based electronics unit sends a train of pulses, including the reset pulses, along a wire 50 from whence it is supplied to the sequencers 52 and 60, the transmitter 68, and the several range gates 96, 96a, 96b, 96c, etc., causing each of these units to operate in synchronism. Identical electronic units controlling the operation of other transducers are preferably connected to receive the same timing pulses to initiate transmit signals from corresponding transducer elements since the scanning of a plurality of transducers should be coordinated to avoid having one transducer directly receive the transmitted pulse of another. With reference to FIG. 1, when the transducer element on the far left of transducer 10 transmits the beam which radiates to the right closest to the bottom, the corresponding transducer element of transducer 12 should also be energized, causing a beam to radiate toward the right closest to the bottom. As each successive transducer element in transducer 10 is caused to radiate counterclockwise around the fan-shaped radiation pattern shown, the corresponding element in transducer 12 should also be energized. Thus the sweep pattern as one looks at FIG. 1 would be something like the pattern of parallel operating windshield wipers except that when the pattern has once been swept, it returns to the beginning instead of sweeping back clockwise. By synchronizing the timing pulses to the transducers as described, transmitted pulses from neighboring transducers are prevented from appearing as echo signals and being counted by each other.

Referring now to operation of the system described above and recognizing that identical systems for other transducers will be operated exactly in synchronism from the same pulse train, it will be assumed that a reset pulse has just been received which has set the BCD generators 52 and 60 to zero, and no transmission is taking place. No pulses are being received since all of the electronic switches in switching unit 58 are open. Sequencer 100 may or may not be operating to display previously stored counts from the counter. Upon receipt of the next timing pulse, the binary one signal from BCD generator 52 is initiated to close switch 56, and the transmit signal from transmitter 68 is supplied through this switch to transducer element 38. This timing pulse also initiates a one-millisecond delay by timing circuit 74, after which the preamplifier 76 is enabled so that echo signals from fish in the sector of transducer 38 will be received and amplified, threshold detected in detector 82, and used to trigger the 100-microsecond monostable multivibrator 84 which places a standard return pulse on wire 86. This same initial timing pulse is supplied to BCD generator 60 which causes it to close switch 64 to supply power to AND gate 94, and said pulse also initiates conduction from range gate 96 which, in conjunction with power from gate 94, causes AND gate 94 to conduct, closing switch 90 and making it possible for any counts passing switch 90 to register on counter 98. The next timing pulse is supplied to energize the transmitter 68 and range gate 96 and to BCD generators 52 and 60 causing these generators to supply the binary number two signal to close switches 56a and 66a, thereby insonifying the next sector counterclockwise from the one closest to the bottom and opening the receiver to receive reflections from this sector. Subsequent timing pulses initiate operation of successive transmit beams as described across the fan-shaped pattern. After receipt of 64 such timing pulses, the sweep is complete and the next pulse will be a wide reset pulse which resets the BCD generators 52 and 62, causing the sweep pattern to begin anew.

There are obviously many possible modifications for the system described above. The number of individual transponders or transponder elements in each transponder used may vary with the desired pattern which it is desired to sweep, the beam width pattern of each transducer element and/or its power handling capability, and the frequency of operation. The BCD generator 52 and switching unit 58 are preferably physically located with the transducer and the structure of FIG. 6 in the stream and the remainder of the system with the shore-based unit. One shore-based unit may contain a plurality of the circuits such as shown on FIG. 7 (one for each transducer) all operated with a single clock and with a single display means. It is also possible to position the transducers on the bottom of a boat or a plurality of boats such that the fan-shaped pattern or patterns or a modification thereof sweep downward into the water.

We claim:

1. In a system for counting fish migrating in a body of water including sonar transducer means positioned in the water,
    electronic circuit means for providing transmit pulses to said transducer means and for receiving echo signals from said transducer means,
    said circuit means including a source of electrical power,
    an electric clock circuit connected to said source producing clock pulses at regular intervals to initiate said transmit pulses,
    receiver means,
    means responsive to a time interval after the initiation of said transmit pulses for enabling said receiver means to receive echo pulses,
    and counter means connected to receive and count the echo pulses from said receiver means:
    wherein the improvement comprises at least one acoustic focusing liquid lens transducer comprising a housing which is generally circular in at least one plane, acoustically transparent and filled with a low sound velocity liquid, a large numer of individual piezoelectric transducer elements arranged in the inside of said housing across an arc of the bottom thereof, said elements each transmitting and receiving from a very narrow beam width and being arranged such that said transmitted beams are side by side and successively illuminate a generally fan-shaped volume across said stream;

a first binary coded decimal circuit which responds to said clock pulses to produce a large number of sequential binary signals and a first group of electronic switches each of which is connected to one of said transducer elements, said switches being successively closed by said binary signals to initiate said transmit pulses;

time delay means responsive to said clock pulses initiating a delay period and then enabling said receiver for a set period to receive any echo signals resulting from the immediately preceding transmit pulse, means for amplifying said echo signals, a threshold detector for detecting only echo signals above a certain magnitude, and a signal conductor to which said signals are supplied;

a second binary coded decimal circuit connected to receive said clock pulses in synchronism with said first binary coded decimal circuit to produce a large number of binary signals and a second group of electronic switches connected to said power source, which switches are successively closed by said binary signals, a plurality of AND gates each of which has one input terminal connected to one of said second group of electronic switches, a plurality of adjustable range gates connected to the other input terminal of said AND gates and having as input signals said timing pulses such that said AND gates conduct from a time initiated by said timing pulses to a time limit set on said range gates, a third group of electronic switches connected to receive input signals from the said AND gates and said signal conductor such that each of said electronic switches is closed to conduct said detected echo signals during a time period set on its respective range gate;

a plurality of counters each connected to one of said third group of electronic switches to receive and count the echo signals from one of said transducer elements, and display means for displaying the counts from said counters.

2. A fish counting system as claimed in claim 1 wherein said display means includes a digital numerical display.

3. A fish counting system as claimed in claim 1 wherein said display means includes a printer.

4. A fish counting system as claimed in claim 3 wherein a timing device is connected to said printer for causing said printer to print out the counts on said counters at predetermined time intervals.

5. A fish counting system as claimed in claim 2 wherein selector means are connected to said digital numerical display for selectively displaying the counts from each individual counter.

6. A fish counting system as claimed in claim 1 wherein said display means includes a third binary coded decimal circuit and a third group of electronic switches for connecting said counters to said display means.

7. A fish counting system as claimed in claim 1 wherein said electric clock circuit produces counting pulses of very short duration each of which is used by said first binary coded decimal circuit to initiate a transmit signal from one of said transducer elements and synchronizing pulses for resetting said binary coded decimal circuits.

8. A fish counting system as claimed in claim 1 wherein said transducer means comprises a plurality of said transducers, each of which is connected to one of said first binary coded decimal circuits and said first group of electronic switches which are connected to receive said clock pulses such that corresponding transducer elements in said transducer means are caused to transmit in synchronism.

9. In a system for counting fish in a body of water including sonar transducer means positioned in said water, electronic circuit means for providing transmit pulses to said transducer means and for receiving echo signals from said transducer means, said circuit means including a source of electrical power, an electric clock circuit connected to said source producing clock pulses at regular intervals to initiate said transmit pulses, receiver means, means responsive to a time interval after the initiation of said transmit pulses for enabling said receiver means to receive echo pulses, and counter means connected to receive and count the echo pulses from said receiver means:

wherein the improvement comprises at least one transducer having an acoustically transparent housing which is generally circular in at least one plane and a plurality of individual transducer elements arranged across an arc of the inside of said housing, said elements each transmitting and receiving from a very narrow beam width and arranged such that said transmitted beams are side by side and successively illuminate a generally fan-shaped pattern across said stream;

a transmitter, first digitally coded switch means including a plurality of switches connected to each of said transducer elements and responsive to said clock pulses for successively closing said switches and energizing said transmitter such that said transducer elements are caused to transmit in sequence, amplification means connected to said switch means, timing means responsive to said clock pulses for disabling said amplification means for a time interval and then enabling said amplification means such that it conducts echo signals after said time interval, a conductor carrying said echo signals, a second digitally coded switch means including a second plurality of switches connected to receive said clock pulses in synchronism with said first digitally coded switch means connected to a source of voltage and responsive to said clock pulses for successively closing said second plurality of switches, a plurality of AND gates each of which has one input terminal connected to one of said second plurality of switches, a plurality of range gates connected to the other input terminal of each of said AND gates and having as input signals said timing pulses such that said AND gates conduct for a time initiated by said timing pulses to a time limit set on said range gates, a third plurality of switches connected to receive input signals from said AND gates and echo signals from said conductor, a plurality of counters each connected to one of said third plurality of switches to receive and count the echo signals from one of said transducer elements, and display means for displaying the counts from said counters.

10. In a system for counting fish migrating in a body of water including sonar transducer means positioned in the water, electronic circuit means for providing transmit pulses to said transducer means and for receiving echo signals from said transducer means, said circuit means including a source of electrical power, an electric clock circuit connected to said source producing clock pulses at regular intervals to initiate said transmit pulses, receiver means, means responsive to a time interval after the initiation of said transmit pulses for enabling said receiver means to receive echo pulses, and counter means connected to receive and count the echo pulses from said receiver means:

wherein the improvement comprises at least one acoustic focusing liquid lens transducer comprising a housing which is generally circular in at least one plane, acoustically transparent and filled with a low sound velocity liquid, a large number of individual piezoelectric transducer elements arranged in the inside of said housing across an arc of the bottom thereof, said elements each transmitting and receiving from a very narrow beam width and being arranged such that said transmitted beams are side by side and successively illuminate a generally fan-shaped colume across said steam;

a first sequential switching circuit connected to said transducer elements including a first plurality of switch means connected to receive said clock pulses for successively closing said switches and energizing said transmitter such that said transducer elements are caused to transmit in sequence;

an amplifier connected to said switch means and timing means for enabling said amplification means after a desired time interval following said timing pulses, threshold detection means connected to said amplifier and means converting echo signals passing said detection means to uniform echo pulses, counter means for each of said transducer elements, a second sequential switching circuit including a second plurality of switches connected to said counter means connected to receive said clock pulses for switching said uniform echo signals in synchronism to said counter means, and means for displaying the counts on said counters.

11. A system for counting fish as set forth in claim 10 wherein range gate means are connected to said second sequential switching means to vary the time available for counting echo pulses from each transducer element.

* * * * *